Sept. 6, 1955  R. A. FINDLAY  2,717,229
SOLVENT EXTRACTION PROCESS
Filed Sept. 22, 1952
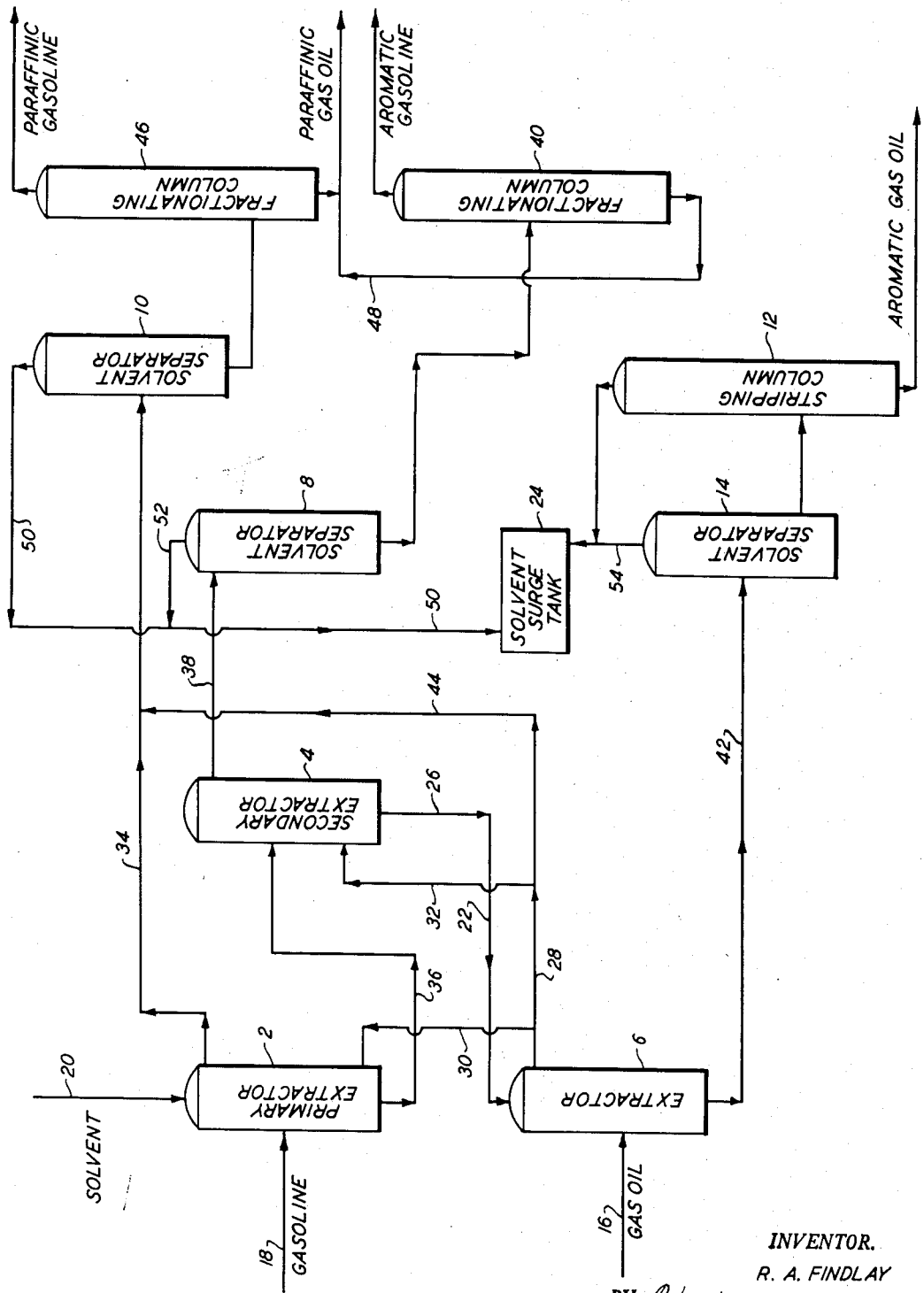
INVENTOR.
R. A. FINDLAY
BY Hudson & Young
ATTORNEYS United States Patent Office 2,717,229
Patented Sept. 6, 1955

2,717,229

SOLVENT EXTRACTION PROCESS

Robert A. Findlay, Bartlesville, Okla., assignor to Phillips Petroleum Company, a corporation of Delaware Application September 22, 1952, Serial No. 310,861

6 Claims. (Cl. 196—14.15)

This invention relates to the solvent extractive separation of close boiling compounds. In one of its more specific aspects it relates to liquid-liquid extraction for the separation of close boiling compounds at atmospheric temperatures.

The general problem with which the present invention is concerned is the separation of compounds whose normal volatilities are such that the separation cannot be accomplished easily by ordinary distillation methods. The problem is especially serious in the case of separation of aromatics from paraffins in gasoline, gas oil, lubricating oils and the like. At present one method of accomplishing these separations is by solvent extraction. Liquid-liquid extraction methods are used, and the separation can be carried out with much less energy than required for extractive distillation but solvents are nevertheless expensive and large quantities are needed when carrying out two extractions, for example when it is desired to separate aromatics from paraffins in both gas oil and gasoline streams.

One embodiment of my invention pertains to the discovery of a method whereby close boiling compounds can be conveniently and economically removed from two different hydrocarbon mixtures by liquid-liquid extraction. An object of my invention is to provide an improved solvent extraction method. Another object of my invention is to provide a method for the separation of close boiling chemical compounds. Still another object of my invention is to provide a method for the separation of close boiling compounds which requires the expenditure of minimum amounts of energy. Still another object is to provide a solvent extraction process for separating close boiling compounds under atmospheric temperature conditions. Still other objects and advantages will be apparent upon reading the following description.

In accordance with an embodiment of this invention a solvent having aromatics dissolved therein is contacted with a raffinate from the solvent extraction of a mixture of relatively higher boiling hydrocarbons (than the aromatics dissolved in the solvent) to remove the aromatics from said solvent, thereby obtaining a solvent saturated with non-aromatic hydrocarbons from the higher boiling mixture. This saturated solvent is then employed as solvent in the extraction of an additional quantity of the higher boiling hydrocarbon mixture to remove aromatics therefrom and to obtain raffinate employed as indicated, in removing from solvent, aromatics of a lower boiling hydrocarbon mixture. For instance, a solvent, say sulfur dioxide, having dissolved therein aromatics boiling below the gas oil boiling range, can be obtained from any source. To remove the aromatics therefrom the solvent can be contacted with a raffinate from the solvent extraction of a mixture of higher boiling hydrocarbons, say gas oil from which gas oil aromatics have been removed as the extract. By the use of this raffinate the lower boiling aromatics in the solvent will be replaced by the gas oil non-aromatic component. The solvent, now saturated with the non-aromatic gas oil component, can now be used in the further extraction of gas oil to remove aromatics therefrom and to provide a raffinate with which to contact the solvent containing lower boiling aromatics.

Normally the solvent containing the lower boiling aromatics will be obtained as an extract from a prior extraction. Thus in accordance with this invention a process is provided wherein two mixtures of hydrocarbons are concomitantly solvent extracted with a selective solvent, one mixture comprising aromatics and hydrocarbons less soluble in the solvent than aromatics, and the other being a mixture of relatively higher boiling hydrocarbons comprising aromatics and hydrocarbons less soluble in the solvent than aromatics. I have discovered that these two extractions can be carried out by extracting said lower boiling hydrocarbon mixture with said solvent to produce a primary extract containing an aromatic component, stripping said primary extract with a raffinate from said concomitant extraction of the higher boiling hydrocarbon mixture to remove the aromatic component from said primary extract and to form a secondary extract, and extracting said higher boiling hydrocarbon mixture with said secondary extract.

For the purpose of further illustrating this invention a flow diagram of a method of carrying out the invention is represented in the accompanying drawing. The lower boiling hydrocarbon mixture is gasoline and the higher boiling mixture is a gas oil.

The figure in the drawing is a flow diagram illustrating an embodiment of the invention.

In the figure reference characters 2, 4 and 6 represent three towers or vessels adapted for carrying out liquid-liquid extraction operations, 8, 10 and 12 are solvent strippers, and 14 is a flash tank. All are interconnected by pipe lines as shown on the drawing and hereinafter described, and equipped with necessary valves, pumps, heaters, heat exchangers and other auxiliary equipment, not shown.

In operation a gasoline fraction is passed to a primary gasoline extractor 2 from line 18 and a gas oil stream is conducted through line 16 to an extractor 6. In these two columns the respective fractions are solvent extracted with sulfur dioxide to remove aromatics. Sulfur dioxide is fed to column 2 through line 20. For the gas oil extraction sulfur dioxide is passed to column 6 through line 22, in the beginning, from tank 24 and subsequently from line 26 as will be described hereinafter. A portion of the raffinate from the gas oil extraction is conducted through lines 28 and 30 to the bottom of primary gasoline extraction column 2 where it is used as a stripping oil feed. Extract from the gasoline extraction is passed from column 2 through line 36 to a secondary extractor 4. Another portion of the gas oil raffinate is conducted through lines 28 and 32 to the bottom of secondary extractor 4 where it is used as a stripping agent to remove aromatic gasoline from the sulfur dioxide solvent. The raffinate from secondary extractor 4, comprising paraffinic gas oil and a major amount of aromatic gasoline, is withdrawn through line 38 to a separator or stripper 8 for removal of sulfur dioxide and is then fractionated in a column 40 to recover aromatic gasoline and paraffinic gas oil. The extract from secondary gasoline extractor 4 comprising a sulfur dioxide stream saturated with paraffinic gas oil is conveyed through lines 26 and 22 to gas oil extractor 6 to be used as solvent in said gas oil extractor in lieu of solvent from tank 24 as indicated hereinbefore. Aromatic gas oil is recovered in a conventional manner from gas oil extractor 6, the gas oil extract being passed through line 42 to a flash tank or other separator 14 and stripper 12. Raffinate from gas oil extractor 6 which is not used either in column 2 or 4 is passed through lines 28 and 44 and combined in line 34 with raffinate withdrawn from primary extractor 2. This raffinate stream comprising paraffinic gas oil and a major amount of paraffinic gasoline is stripped or otherwise treated in a separator 10 to remove solvent and is then fractionated in column 46 to recover paraffinic gasoline and paraffinic gas oil. The paraffinic gas oil can then be combined with paraffinic gas oil from column 40 if desired using line 48.

Lines 50, 52 and 54 are provided for returning solvent to solvent surge tank 24. The solvent will, of course, be passed through compressors, not shown, prior to entering surge tank 24.

To further illustrate my invention, the following example is presented:

An amount of 5000 barrels per stream day of a gas oil having a boiling range of 400° F. to 650° F. and an aniline point of 150° F. is conducted into extraction tower 6 at a temperature of 50° F. through line 16. Sulfur dioxide as a solvent is passed into tower 6 at the top through line 22 to produce raffinate and extract phases to be used as described hereinafter. Concomitantly 1000 barrels per day of a gasoline stream containing 47 per cent aromatics and giving the ASTM distillation results listed hereinafter are introduced at a temperature of 50° F. into primary extractor 2 through line 18 to be extracted countercurrently with from 1800 to 2300 thousand pounds of sulfur dioxide entering at 20 as the selective solvent. As a stripping oil feed to said gasoline extraction column 1500 barrels per day of raffinate from the aforementioned gas oil extraction are passed to extractor 2 through lines 28 and 30 at a temperature of 60° F. The raffinate phase from primary extractor 2 is withdrawn through line 34, combined with gas oil raffinate 44 not used for stripping purposes and conducted to stripper 10 where solvent is removed. From stripper 10 the raffinate is passed to a fractionation column 46 to separate paraffinic gasoline from paraffinic gas oil in accordance with methods well known to those skilled in the art, thereby recovering 500 barrels per day of paraffinic gasoline containing from 5 to 8 per cent aromatics. The gasoline extract phase from primary extractor 2 is conducted to secondary extractor 4. In said secondary extractor 2000 barrels per day of gas oil raffiniate are introduced from tower 6 through lines 28 and 32 to serve as a stripping agent to remove aromatic gasoline from the solvent. The raffinate phase from secondary extractor 4 is stripped in separator 8 to remove solvent therefrom and then withdrawn to fractionation column 40 to recover aromatic gasoline and a portion of the paraffinic gas oil. In the fractionator quantities recovered are 500 barrels per day of aromatic gasoline containing 92 per cent to 95 per cent aromatics, and sufficient paraffinic gas oil to bring the total to 3500 barrels per day having an aniline point of 196° F. when said paraffinic gas oil is mixed with paraffinic gas oil recovered from the raffinate from the primary gasoline extraction. The extract from the secondary extractor 4 is conducted to gas oil extractor 6 and used as the solvent in that extraction operation. And, as indicated, the raffinate phase from this gas oil extraction at a temperature of 60° F. is passed to the primary and secondary gasoline extractors respectively. The extract phase from gas oil extractor 6 at a temperature of 50° F. is conducted to a stripping column designated as 14 and 1500 barrels per day of aromatic gas oil having an aniline point of 40° F. are recovered by means well known in the art.

In the following table are given ASTM distillation results for the gasoline feed, and aromatic gasoline and paraffinic gasoline products recited in the preceding example as well as aromatic content.

| ASTM Dist'l. | Gasoline Feed | Aromatic Gasoline | Paraffinic Gasoline |
|---|---|---|---|
| IBP | 137 | 142 | 140 |
| 10% | 191 | 218 | 180 |
| 50% | 224 | 243 | 214 |
| 90% | 268 | 277 | 254 |
| EP | 312 | 326 | 294 |
| Percent Aromatics | 47 | 93 | 8 |

From the above description and examples the advantages of this invention are markedly clear. The separations are made unusually economically since the bulk of the sulfur dioxide solvent is circulated through the gasoline extraction step without vaporization. In addition less recompression of sulfur dioxide employed in the gas oil extractor is required since that portion recovered from the secondary gasoline extractor is in the liquid phase and can be passed directly to the gas oil extractor. It is significant that only about 2 per cent to 5 per cent more sulfur dioxide must be compressed and condensed when operating both the gasoline and the gas oil extractions than when operating the gas oil extraction alone.

A further advantage of this invention results from the use of the paraffinic gas oil raffinate as a stripping oil in the primary gasoline extractor. This obviates the use of an extraneous stripping oil for this extractor. More important is the means provided by the invention for removing aromatic gasoline from the solvent in the secondary gasoline extractor to provide solvent for the gas oil extraction.

This invention has been described using gas oil and gasoline as feed stocks. Obviously lubricating oils and the like can also be employed, and other modifications and variations will also occur to those skilled in the art. Thus the process can be carried out batchwise or in a continuous manner as described. Moreover solvents other than sulfur dioxide can be used in the process of this invention, for example nitrobenzene, furfural, phenol, and cresylic acid. In addition means of contacting the feed with the solvent and making final separations will also occur to those skilled in the art, given the benefit of the teachings of this invention. Such variations can be made without departing from the spirit and the scope of the instant invention.

I claim:

1. In a process which comprises concomitantly solvent extracting a gasoline stream and a gas oil stream for separating aromatics therefrom the steps which comprise extracting gasoline in a first extraction zone with a selective solvent and in the presence of gas oil raffinate as a stripping agent to produce a primary extract containing an aromatic gasoline component and a raffinate containing a paraffinic gasoline component, separately stripping said primary extract in a secondary extraction zone with gas oil raffinate to remove the aromatic gasoline component from said extract, extracting a gas oil fraction with the extract from said stripping operation, withdrawing as a single stream from said gas oil extraction a gas oil raffinate for use in the two stripping operations, any excess being bypassed to the raffiniate stream from the gasoline extraction step, flashing each gasoline extraction raffinate and gas oil extract to remove solvent therefrom and subsequently distilling each stream to recover paraffinic and aromatic components.

2. A process wherein a gasoline stream and a gas oil stream are concomitantly solvent extracted to separate aromatic hydrocarbons from paraffinic hydrocarbons therein which comprises extracting gasoline with solvent and in the presence of gas oil raffinate as a stripping agent to produce a primary extract containing aromatic gasoline and a raffinate containing paraffinic gasoline, fractionating said raffinate to separate paraffinic gasoline from paraffinic gas oil, separately stripping said primary extract with raffinate from said gas oil extraction to remove aromatic gasoline from said primary extract in the form of a secondary raffinate, fractionating said secondary raffinate to recover aromatic gasoline and paraffinic gas oil, extracting gas oil with said secondary gasoline extract to obtain gas oil raffinate used in the two gasoline extractions and gas oil extract, said gas oil raffinate being withdrawn as a single stream and then divided, stripping said gas oil extract to recover aromatic gas oil, and by-passing any excess gas oil raffinate to the raffinate stream containing paraffinic gasoline.

3. In a process which comprises concomitantly solvent extracting a gasoline stream and a gas oil stream using solvent to separate aromatics therefrom, the steps which comprise extracting gasoline in a first extraction zone with a solvent and in the presence of gas oil extraction raffinate as a stripping agent to produce a primary extract containing an aromatic gasoline component and a raffinate containing a paraffinic gasoline component, recovering paraffinic gasoline and paraffinic gas oil from said raffinate, separately stripping said primary extract in a secondary extraction zone with gas oil extraction raffinate to produce a secondary extract containing paraffinic gas oil and a secondary raffinate containing the aromatic gasoline component and paraffinic gas oil, recovering aromatic gasoline and paraffinic gas oil from said secondary raffinate, extracting gas oil with the secondary extract and any additional amount of solvent of the type used in the gasoline extraction which may be necessary to produce an extract containing aromatic gas oil and a raffinate to be employed in the two gasoline extractions, said raffinate being withdrawn as a single stream and then divided, recovering the aromatic gas oil, and combining raffinate not used in the two gasoline extractions with raffinate from the primary gasoline extraction.

4. In a process which comprises concomitantly solvent extracting a gasoline stream and a gas oil stream with sulfur dioxide to separate aromatics therefrom, the steps which comprise extracting gasoline in a first extraction zone with sulfur dioxide and in the presence of gas oil raffinate as a stripping agent to produce a primary extract containing an aromatic gasoline component and a raffinate containing a paraffinic gasoline component, distilling said raffinate to recover paraffinic gasoline and paraffinic gas oil, separately stripping said primary extract in a secondary extraction zone with gas oil extraction raffinate as stripping agent to remove aromatic gasoline from the sulfur dioxide thereby producing a secondary extract containing paraffinic gas oil and a secondary raffinate containing aromatic gasoline and paraffinic gas oil, distilling said secondary raffinate to recover aromatic gasoline and paraffinic gas oil therefrom, extracting gas oil with the secondary extract, and any additional amount of sulfur dioxide necessary, to produce an extract containing aromatic gas oil and raffinate employed in the two gasoline extractions, said raffinate being withdrawn as a single stream and then divided distilling said gas oil extract to recover aromatic gas oil and combining gas oil raffinate not used in the gasoline extraction steps with raffinate from the primary gasoline extraction.

5. In a process which comprises concomitantly solvent extracting a gasoline stream and a gas oil stream with sulfur dioxide to separate aromatics therefrom, the steps which comprise extracting gasoline in a first extraction zone with sulfur dioxide and in the presence of gas oil raffinate as a stripping agent to produce a primary extract containing an aromatic gasoline component and a raffinate containing a paraffinic gasoline component, recovering sulfur dioxide from said raffinate, distilling said raffinate to recover paraffinic gasoline and paraffinic gas oil, separately stripping said primary extract in a secondary extraction zone with gas oil extraction raffinate as stripping agent to remove aromatic gasoline from the sulfur dioxide thereby producing a secondary extract containing paraffinic gas oil and a secondary raffinate containing aromatic gasoline and paraffinic gas oil, recovering sulfur dioxide from said raffinate, distilling said secondary raffinate to recover aromatic gasoline and paraffinic gas oil therefrom, extracting gas oil with the secondary extract, and any additional amount of sulfur dioxide necessary, to produce an extract containing aromatic gas oil and raffinate employed in the two gasoline extractions, said raffinate being withdrawn as a single stream and then divided, recovering sulfur dioxide from said gas oil, distilling said gas oil extract to recover aromatic gas oil and combining gas oil raffinate not used in the gasoline extraction steps with raffinate from the primary gasoline extraction.

6. In a process which comprises simultaneously solvent extracting a gasoline stream and a gas oil stream for separating aromatics therefrom, the steps comprising extracting gasoline in a first extraction zone with a solvent and in the presence of gas oil raffinate as a stripping agent to produce a primary extract containing an aromatic gasoline component and a raffinate containing a paraffinic component, stripping said primary extract in a separate secondary extraction zone with gas oil raffinate to remove the aromatic gasoline component from said extract, extracting the gas oil stream with the extract from said secondary extraction, withdrawing as a single stream from said gas oil extraction a gas oil raffinate, dividing said raffinate into at least two streams for use in the two stripping steps, any excess being by-passed as a third stream for combination with the raffinate from the first extraction zone, flashing the combined raffinates and the gas oil extract to remove solvent therefrom, and subsequently distilling each stream to recover paraffinic and aromatic components.

References Cited in the file of this patent
UNITED STATES PATENTS

| | | |
|---|---|---|
| 2,114,524 | Egli | Apr. 19, 1938 |
| 2,139,392 | Tijmstra | Dec. 6, 1938 |
| 2,201,549 | Van Dijck | May 21, 1940 |
| 2,201,550 | Van Dijck et al. | May 21, 1940 |
| 2,270,827 | Tijmstra | Jan. 20, 1942 |